(12) United States Patent
Nguyen et al.

(10) Patent No.: US 10,768,989 B2
(45) Date of Patent: *Sep. 8, 2020

(54) VIRTUAL VECTOR PROCESSING

(71) Applicant: Intel Corporation, Santa Clara, CA (US)

(72) Inventors: Anthony Nguyen, Castro Valley, CA (US); Engin Ipek, Ithaca, NY (US); Victor Lee, Santa Clara, CA (US); Daehyun Kim, San Jose, CA (US); Mikhail Smelyanskiy, Burlingame, CA (US)

(73) Assignee: Intel Corporation, Santa Clara, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/872,762

(22) Filed: Jan. 16, 2018

(65) Prior Publication Data

US 2019/0026158 A1 Jan. 24, 2019

Related U.S. Application Data

(63) Continuation of application No. 11/386,443, filed on Mar. 22, 2006, now Pat. No. 9,870,267.

(51) Int. Cl.
*G06F 9/50* (2006.01)
*G06F 15/80* (2006.01)

(52) U.S. Cl.
CPC ........ *G06F 9/5044* (2013.01); *G06F 15/8053* (2013.01); *G06F 2209/509* (2013.01)

(58) Field of Classification Search
None
See application file for complete search history.

(56) References Cited

U.S. PATENT DOCUMENTS

| | | | | |
|---|---|---|---|---|
| 5,649,179 A | * | 7/1997 | Steenstra | G06F 9/3822 712/15 |
| 6,266,759 B1 | * | 7/2001 | Birrittella | G06F 9/3824 712/217 |
| 6,832,194 B1 | * | 12/2004 | Mozer | G10L 15/28 704/213 |
| 6,957,435 B2 | | 10/2005 | Armstrong et al. | |
| 7,051,180 B2 | * | 5/2006 | Downer | G06F 9/5061 709/215 |
| 7,376,954 B2 | * | 5/2008 | Kissell | G06F 9/3009 712/214 |
| 7,565,653 B2 | * | 7/2009 | Inoue | G06F 9/4856 718/102 |
| 7,631,171 B2 | * | 12/2009 | Bonebakker | G06F 9/3001 703/26 |

(Continued)

OTHER PUBLICATIONS

Gschwind, M. etal., Synergistic Processing in Cell'S Multicore Architecture, 2006, IEEE, pp. 10-24. (Year: 2006).*
Constantinou, T., etal., Performance Implications of a Single Thread Migration on a Chip Multi-Core, ACM, ACM SIGARCH Computer Architecture News, Sep. 2005, vol. 33, No. 4, pp. 80-91. ; (Year: 2005).*

(Continued)

*Primary Examiner* — Eric Coleman
(74) *Attorney, Agent, or Firm* — Nicholson De Vos Webster & Elliott LLP (57) ABSTRACT

Methods and apparatus to provide virtualized vector processing are described. In one embodiment, one or more operations corresponding to a virtual vector request are distributed to one or more processor cores for execution.

22 Claims, 6 Drawing Sheets

(56) References Cited

U.S. PATENT DOCUMENTS

| | | | | |
|---|---|---|---|---|
| 7,730,463 B2* | 6/2010 | Eichenberger | ........ | G06F 9/3851 |
| | | | | 712/20 |
| 2004/0006667 A1* | 1/2004 | Bik | ............ | G06F 8/452 |
| | | | | 711/100 |
| 2004/0098709 A1* | 5/2004 | Kyo | ............ | G06F 8/447 |
| | | | | 717/140 |
| 2005/0273769 A1* | 12/2005 | Eichenberger | ........ | G06F 8/4452 |
| | | | | 717/136 |
| 2006/0020769 A1* | 1/2006 | Herrell | ............ | G06F 9/5077 |
| | | | | 712/13 |

OTHER PUBLICATIONS

Rau, B.R., "The Cydra 5 Departmental Supercomputer: Design Philosophies, Decisions, and Trade-offs", IEEE, (Jan. 1989), 22 pgs.
Kozyrakis, Christos, et al., "Overcoming the Limitations of Conventional Vector Processors," (Jun. 2003), 11 pgs.
Krashinsky, Ronny, et al., "The Vector-Thread Architecture", (Jun. 2004), 12 pgs.
Wu, Peng, et al., "An Integrated Simdization Framework Using Virtual Vectors", (Jun. 20-22, 2005), 10 pgs.
Constantinou, T., et al., Performance Implications of a Single Thread Migration on a Chip Multi-Core, Sep. 2005, ACM, ACM SIGARCH Computer Architecture News, vol. 33, No. 4, pp. 80-91.
Gschwind, M. et al., Synergistic Processing in Cell'S Multicore Architecture, 2006, IEEE, IEEE MICRO, pp. 10-24.

* cited by examiner

VIRTUAL VECTOR PROCESSING

BACKGROUND

The present disclosure generally relates to the field of electronics. More particularly, an embodiment of the invention relates to virtualized vector processing.

To improve performance, some computer systems may use a vector processor, e.g., to process large amounts of data in parallel. For example, vector processing may be applied in single-instruction, multiple-data (SIMD) computing, where multiple streams of data are processed in accordance with a single instruction. In SIMD computing, the processing hardware may be designed for a given vector size. Accordingly, the size of the processed vector may be fixed and may not be modified easily. This may limit the use of a vector processor to applications for which the vector processor has been specifically designed. Also, more generally, providing a vector processor in some computer systems may be cost-prohibitive.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Figure 1:
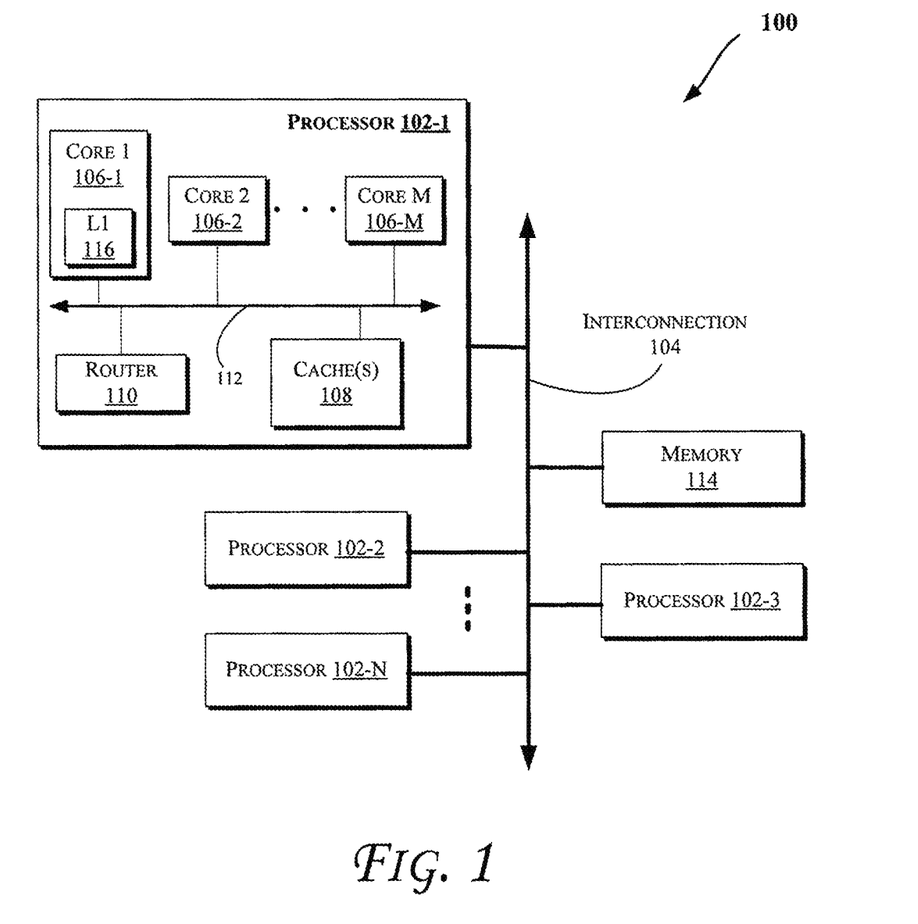
FIGS. 1, 5, and 6 illustrate block diagrams of embodiments of computing systems, which may be utilized to implement various embodiments discussed herein.

Some of the embodiments discussed herein may provide efficient mechanisms for virtual vector (VV) processing, for example, without a dedicated vector unit. Furthermore, some of the processor cores discussed herein may be capable of processing variable vector lengths, such as the processor cores discussed with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as one or more caches 108), buses or interconnection networks (such as a bus or interconnection network 112), memory controllers, or other components. In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection network 104. In an embodiment, the cache 108 may be a level 2 (L2) cache or a last level cache (LLC). Also, each of the cores 106 may include a level 1 (L1) cache (116) (generally referred to herein as "L1 cache 116"). Furthermore, the processor 102-1 may also include a mid-level cache that is shared by several cores (106). Various components of the processor 102-1 may communicate with the cache 108 directly, through a bus or on-chip interconnection network (112), and/or a memory controller or hub.

Figure 2:
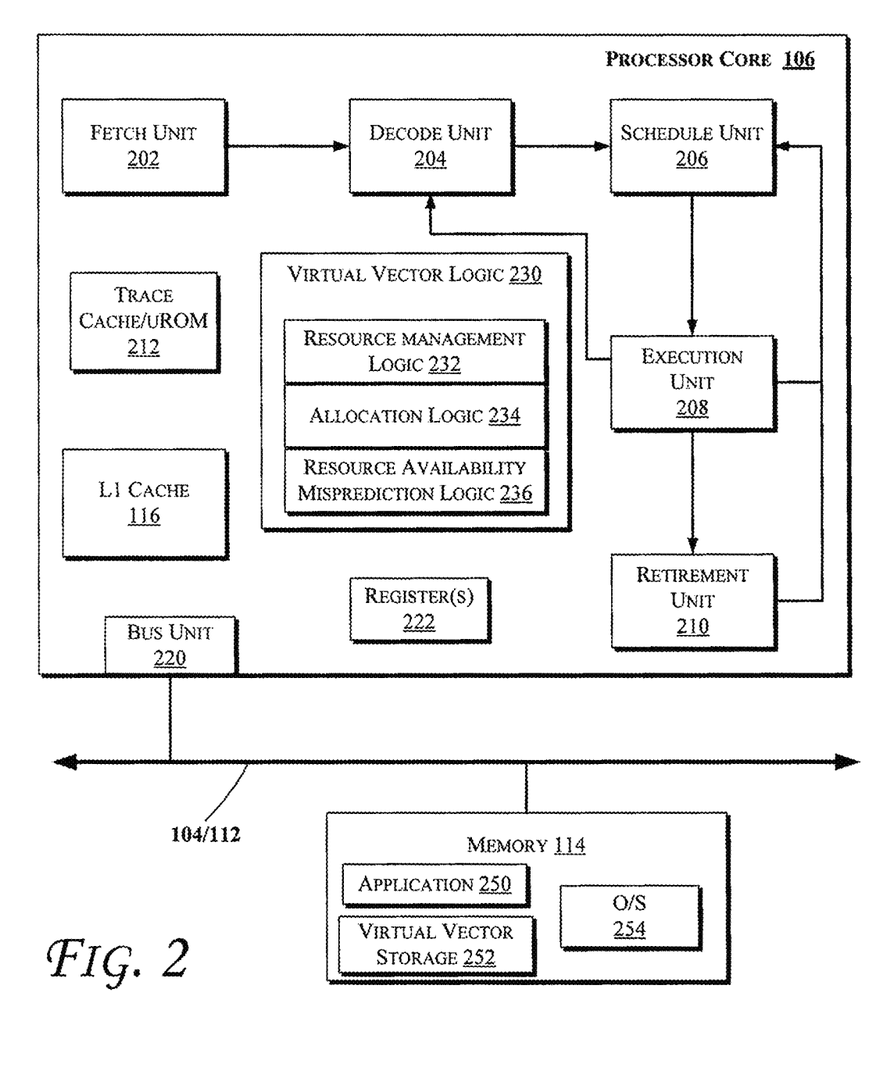
FIG. 2 illustrates a block diagram of portions of a processor core, according to an embodiment of the invention.

FIG. 2 illustrates a block diagram of portions of a processor core 106, according to an embodiment of the invention. In one embodiment, the arrows shown in FIG. 2 illustrate the direction of instruction flow through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnection networks (e.g., interconnection networks 104 and/or 112 of FIG. 1), memory controllers, or other components. In an embodiment, the processor cores 106 shown in FIGS. 1-2 may be utilized to execute one or more threads including those that correspond to a virtual vector as will be further discussed herein, e.g., with reference to FIGS. 3 and 4.

As illustrated in FIG. 2, the processor core 106 may include a fetch unit 202 to fetch instructions for execution by the core 106. The instructions may be fetched from any storage devices such as the memory 114 and/or the memory devices discussed with reference to FIGS. 5 and 6. The core 106 may also include a decode unit 204 to decode the fetched instruction. For instance, the decode unit 204 may decode the fetched instruction into a plurality of uops (micro-operations). Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available. In one embodiment, the schedule unit 206 may schedule and/or issue (or dispatch) decoded instructions to an execution unit 208 for execution. The execution unit 208 may execute the dispatched instructions after they are decoded (e.g., by the decode unit 204) and dispatched (e.g., by the schedule unit 206). In an embodiment, the execution unit 208 may include more than one execution unit, such as a memory execution unit, an integer execution unit, a floating-point execution unit, or other execution units. Further, the execution unit 208 may execute instructions out-of-order. Hence, the processor core 106 may be an out-of-order processor core in one embodiment. The core 106 may also include a retirement unit 210. The retirement unit 210 may retire executed instructions after they are committed. In an embodiment, retirement of the executed instructions may result in processor state being committed from the execution of the instructions, physical registers used by the instructions being de-allocated, etc.

The core 106 may additionally include a trace cache or microcode read-only memory (uROM) 212 to store microcode and/or traces of instructions that have been fetched (e.g., by the fetch unit 202). The microcode stored in the uROM 212 may be used to configure various hardware components of the core 106. In an embodiment, the microcode stored in the uROM 212 may be loaded from another component in communication with the processor core 106, such as a computer-readable medium or other storage device discussed with reference to FIGS. 5 and 6. The core 106 may also include a bus unit 220 to allow communication between components of the processor core 106 and other components (such as the components discussed with reference to FIG. 1) via one or more buses or interconnection networks (e.g., buses 104 and/or 112). As will be discussed herein, e.g., with reference to FIGS. 3-4, the core 106 may include one or more registers 222 to store various types of data. In an embodiment, the registers 222 may be provided as variables stored in the cache 116.

Furthermore, the core 106 may include a virtual vector logic 230 to perform one or more operations corresponding to a virtual vector request. For example, the logic 230 may include a resource management logic 232 (e.g., to maintain and/or track information regarding available resources of the core 106), an allocation logic 234 (e.g., to partition and/or schedule tasks on available resources of the core 106), and/or a resource availability misprediction logic 236 (e.g., to handle situations where runtime management by the logic 232 fails, for instance, when a resource becomes unavailable). Further details regarding the operation of the logics 230-236 will be discussed with reference to FIG. 3.

As shown in FIG. 2, the memory 114 may store a software application 250 which may include instructions corresponding to a virtual vector request. The memory 114 may further include a virtual vector storage 252 portion, e.g., to store data corresponding to in-flight virtual vector operations. The memory 114 may also store an operating system (O/S) 254 which may be utilized to communicate with various components of the computing systems of FIGS. 1 and 5-6.

Figure 3:
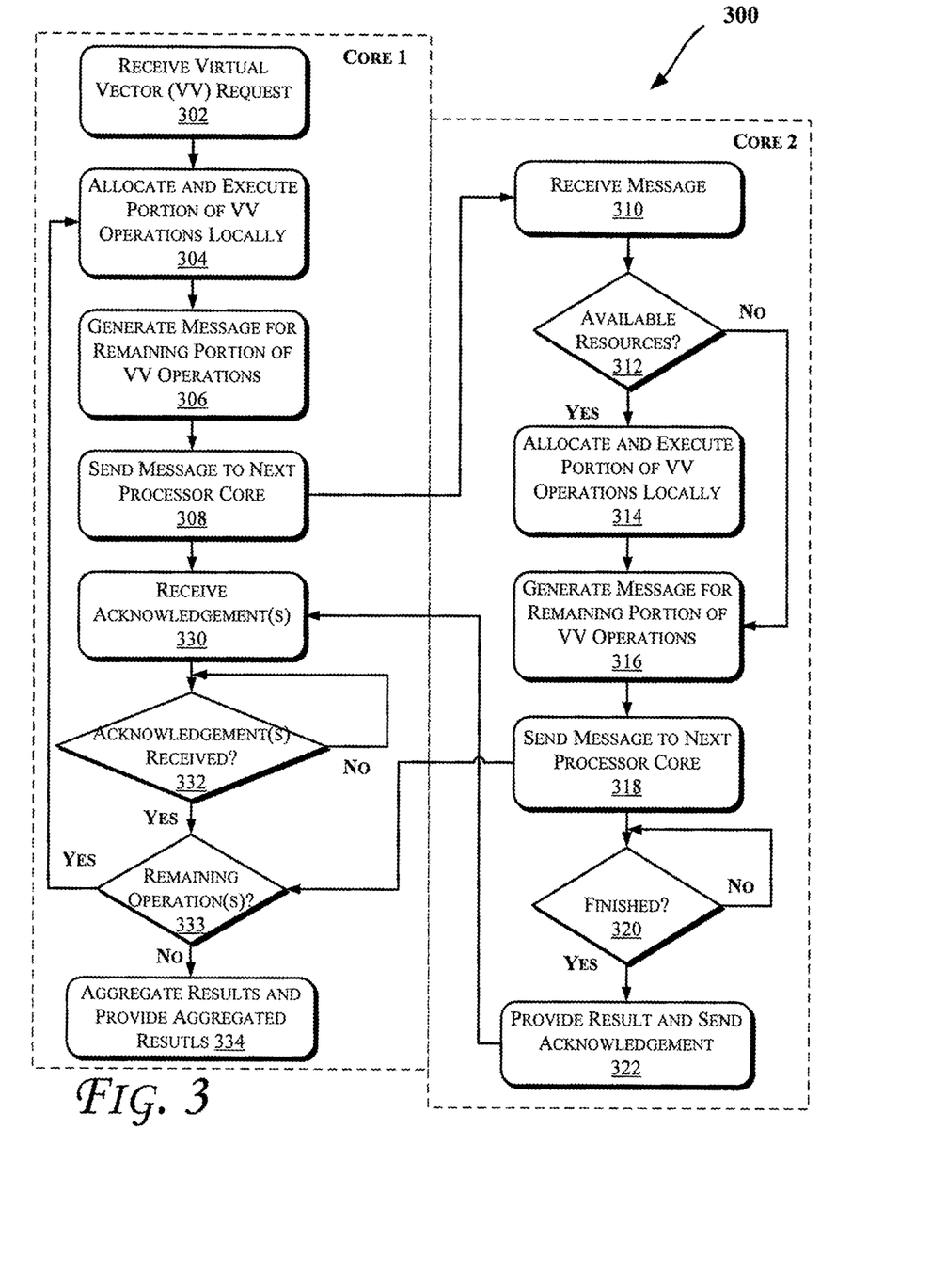
FIG. 3 illustrates a block diagram of a method in accordance with an embodiment of the invention.

FIG. 3 illustrates a block diagram of an embodiment of a method 300 to perform one or more operations corresponding to a virtual vector request. In an embodiment, various components discussed with reference to FIGS. 1-2 and 5-6 may be utilized to perform one or more of the operations discussed with reference to FIG. 3.

Referring to FIGS. 1-3, at an operation 302, a first processor core (which may be any of the cores 106) receives a virtual vector request. For example, the fetch unit 202 may fetch an instruction (corresponding to the application 250 in an embodiment) that indicates the start of a virtual vector request. In accordance with at least one instruction set architecture, a dedicated instruction (e.g., VV_PROLOGUE) may be used to indicate the start of a virtual vector request and another instruction (e.g., VV_EPILOGUE) may be used to indicate the end of a virtual vector request. At an operation 304, the logic 234 (e.g., with the aid of logic 232) may allocate a portion of one or more operations corresponding to the virtual vector request to the first core. The logic 234 may further schedule one or more operations corresponding to the allocated portion of the virtual vector request on available resources of the first core, e.g., by communicating with the schedule unit 206. The first core may then perform (e.g., execute) the allocated operations as discussed with reference to FIG. 2.

In one embodiment, the resource management logic 232 may maintain and/or track available resources of the core 106, e.g., such as free hardware contexts, cache banks with useful data (such as banks in caches 108 and/or 116), etc. In an embodiment, the logic 232 may assume that every resource is available on the system (e.g., system 100 of FIG. 1). Alternatively, the logic 232 may exchange resource information periodically so that each core 106 can maintain up-to-date information about other available resources on the system (e.g., system 100 of FIG. 1).

At an operation 306, the virtual vector logic 230 may generate a message (e.g., that may be embodied as a signal) corresponding to the remaining portion of the operations corresponding to the virtual vector request that has not been allocated to the first core at operation 304. Various types of data included in the message will be discussed with reference to FIG. 4. The generated message of operation 306 may then be sent to a next (e.g., a second) processor core (e.g., one of the other cores 106) at an operation 308, for example, through the interconnection networks 104 and/or 112 via the bus unit 220. A second processor core may receive the message transmitted over the interconnection networks 104 and/or 112 at an operation 310, e.g., by the second core's respective bus unit 220.

At an operation 312, the logic 232 of the second core may determine whether the second core has available resources that may be allocated to perform a portion of the operations identified by the message of operation 310. If the logic 232 of the second core determines that there are available resources, the logic 234 may allocate a portion of the operations identified by the message of operation 310 for execution on the second core at an operation 314.

In one embodiment, a two-level allocation policy may be used at operations 304 and/or 314 to determine the vector length. First, a local decision may be made based on current core resource availability (such as determined by the resource management logic 232). Second, a global decision may be made based on other cores resource availability (e.g., based on information provided by respective logics 232). In an embodiment, core availability information regarding every core in the system may be maintained in one location (or by each core), e.g., by periodically exchanging this information either through dedicated messages or by appending this information to other system or application messages (e.g., through the interconnection networks 104 and/or 112). During allocation (e.g., at operations 304 and/or 310), the respective core may use resource availability information, as well as other auxiliary or communication overhead information (such as a relative distance (e.g., in hops) to a given core, time per hop, time per loop iteration, etc.) to derive the number of operations to compute (or allocate) locally.

If it is determined that no resources are available at operation 312 or after operation 314, at an operation 316, the logic 230 of the second core may generate a message (e.g., that may be embodied as a signal) corresponding to the remaining portion of the operations of the virtual vector request that has not been allocated to the second core (and the first core based on operation 304). The generated message of operation 316 may then be sent to a next (e.g., a third) processor core (e.g., one of the other cores 106) at an operation 318, for example, through the interconnection networks 104 and/or 112 via the bus unit 220. In an embodiment (e.g., with a dual processor core implementation), the next core referred to at operation 318 may be the first core. Furthermore, in one embodiment, at operation 304, the allocation logic 234 of the first core may allocate a sufficient number of operations corresponding to the virtual vector request (302) to cover round-trip latency of messages that are sent to other cores at operations 308 and/or 318.

At an operation 320, the logic 230 may determine whether the allocated operations (314) have finished or otherwise are retired (e.g., by communicating with the retirement unit 210 or other portion of second core). In an embodiment, if an exception (such as a page fault) occurs during execution (e.g., at operations 304 or 314), the logic 230 of the core that has caused the exception may send a message to the logic 230 of other cores to indicate the existence of an exception. In case of an exception at operation 304, the first core may handle the exception in non-virtual vector execution mode. In case of an exception at operation 314, the second core may send a message to other cores and wait until the exception is handled (e.g., by the first core). Cores other than the first core that receive a message regarding an exception may store an indication of existence of the exception and refrain from sending a message if the same exception occurs locally. Once the first core handles an exception generated at operation 314, the first core may send a message to the other cores to indicate that the specific exception has been handled. Furthermore, in situations when a resource of the second core becomes unavailable during runtime, the corresponding logic 236 may either send the operation to the first core for execution (or dispatch to another core) or wait for the resource to become available.

Once the allocated operations to the second core are finished, at an operation 322, the logic 230 may provide the result and send an acknowledgement to the first core. In an embodiment, the second core may store the result corresponding to operation 322 in the virtual vector storage 252, in the cache 116, in one or more of the registers 222, or in another location that is accessible by the first core. Alternatively, the second core may transmit the result together with the acknowledgement at operation 322.

At operation 330, the first core may receive one or more acknowledgements from one or more other cores that have allocated and executed a portion of the operations corresponding to the virtual vector request of operation 302. Once the first core receives all the acknowledgements (332), the first core may aggregate the results (which may be stored in various locations or provided with the acknowledgement signals such as discussed with reference to operation 332) at an operation 334. Also, the first core may provide the aggregated results at operation 334, e.g., by storing it in a location within the memory 114.

In an embodiment, all remaining portions of the virtual vector operations (e.g., at operations 306 and/or 316) may not be allocated (or picked up for processing) by the other cores besides the first core. To this end, at an operation 333, the first core (e.g., core 106-1 of FIG. 1) may receive a message generated at the operation 318 by the last participating core (e.g., core 106-2 of FIG. 1) and the message may indicate that there is a remaining portion of the virtual vector operations to be processed. If a remaining portion of the operations exists at operation 333, the first core may continue with operation 304, e.g., until there is no remaining portion left for processing.

Even though FIG. 3 discusses operations with reference to two cores, any number of cores may be used to perform the operations of method 300. Alternatively, when no other cores are present or have resources available such as discussed with reference to operation 312, a single core may perform all the operations corresponding to the virtual vector request of operation 302, e.g., to maintain correctness.

Figure 4:
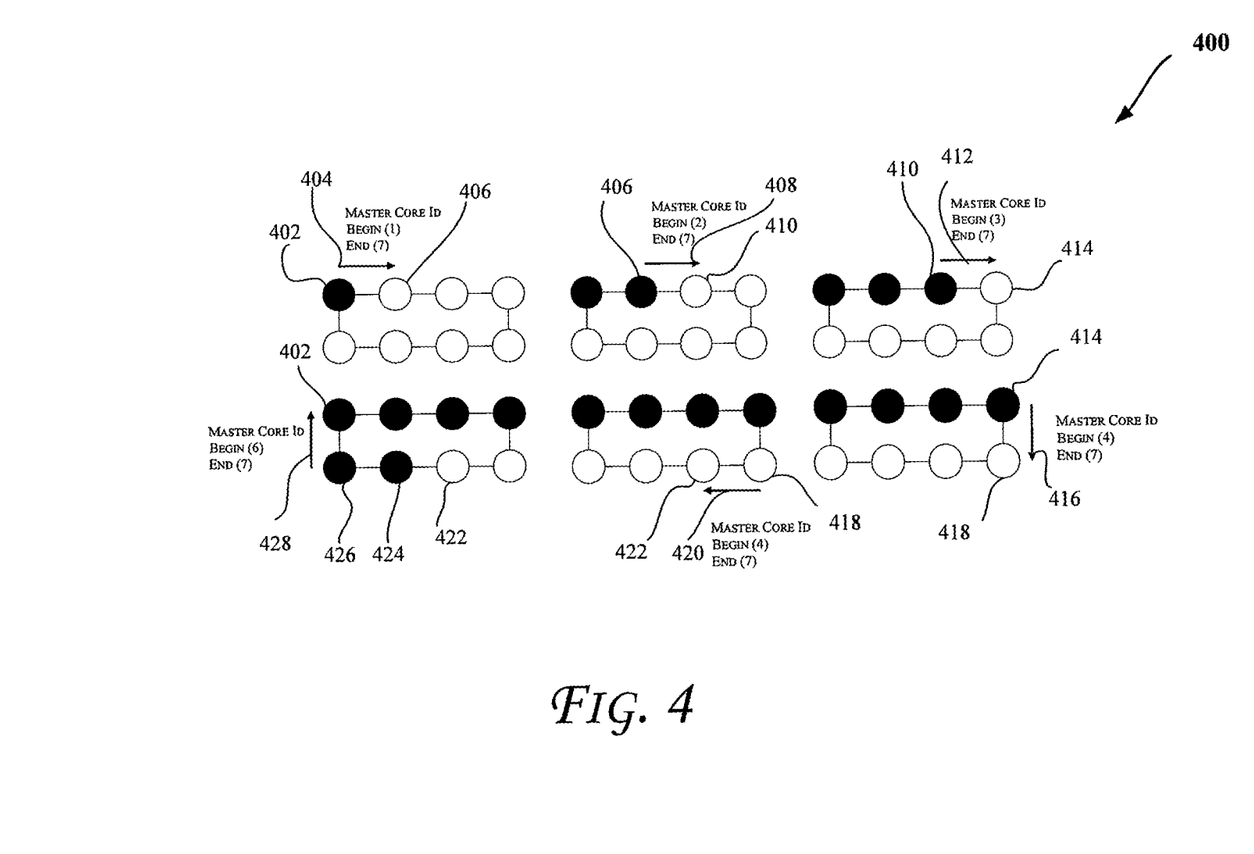
FIG. 4 illustrates a sample block diagram illustrating distribution of virtual vector processing operations amongst multiple cores, in accordance with one embodiment.

FIG. 4 illustrates a sample block diagram illustrating distribution of virtual vector processing operations amongst multiple cores of a computing device 400, in accordance with one embodiment. In FIG. 4, the circles illustrate processor cores. The darkened circles illustrate that the corresponding processor core has allocated a portion of one or more operations corresponding to a virtual vector request. The arrows indicate the passage of a message between two different cores. In one embodiment, FIG. 4 illustrates how the operations of FIG. 3 may be applied in an eight-core computing device.

Referring to FIGS. 1-4, after a core 402 allocates a portion of one or more operations for core 402 (304), the core 402 sends a message 404 to a next core 406. The core 406 may allocate a remaining portion of the operations and send a message 408 to a next core 410. The core 410 may allocate a remaining portion of the operations (e.g., left over operations after allocations by cores 402 and 406) and send a message 412 to a core 414. The core 414 may allocate a remaining portion of the operations (e.g., left over operations after allocations by cores 402, 406, and 410) and send a message 416 to a core 418. The core 418 may not allocate any portion of the operations such as discussed with reference to operation 312 and send a message 420 (e.g., which may be the same as message 416) to a core 422. Similarly, core 422 may not allocate any portion of the operations and send (or forward) a message similar to messages 416 and 420 to cores 424 and 426. Cores 424 and 426 may allocate one or more of the remaining operations and core 426 may then send the message 428 back to core 402. If the message 428 indicates that one or more operations remain to be performed (such as illustrated in FIG. 4), the core 402 may either perform some or all of the remaining operations (such as discussed with reference to operation 304) or forward all or a portion of the remaining operations to the next core (such as discussed with reference to operations 306 and 308). Accordingly, each of the cores 402, 406, 410, 414, 418, 422, 424, and/or 426 may or may not allocate a portion of the remaining operations locally such as discussed with reference to FIG. 3 and generate (316) and send a corresponding message to the next core (such as discussed with reference to operations 312-318).

As shown in FIG. 4, the messages 404, 408, 412, 416, 420, and 428 may include various types of data corresponding to the operations of the virtual vector request of operation 302. For example, these messages may include an identifier corresponding to core 402 (which is referred to in FIG. 4 as the master core, in part, because core 402 initially receives the virtual vector request (302) and dispatches the unallocated portion of operations corresponding to the request of operation 302), a starting value of the remaining operations (e.g., identified by begin(x) in FIG. 4, where x is the starting value), and/or an end value of the remaining operations (e.g., identified by end(y) in FIG. 4, where y is the last value). Hence, the embodiment discussed with reference to FIG. 4 may allow for the dynamic allocation of various portions of the operations corresponding to a virtual vector request (302), depending on available resources of each core in a multi-core computing device 400. This approach may also dynamically load balance the operations of the virtual vector request amongst the cores 402, 406, 410, 414, 418, 422, 424, and/or 426.

Some of the embodiments discussed with reference to FIGS. 1-4 may be utilized in various applications that aim to exploit parallelism. For example, vector processing may be applied in single-instruction, multiple-data (SIMD) computing, where multiple streams of data are processed in accordance with a single instruction. Alternatively, some of the discussed embodiments may be used to spawn segments (or threads) of software instructions that perform different tasks. Accordingly, some embodiments may be able to operate on different vector sizes, e.g., without change to the hardware.

Furthermore, the embodiments discussed with reference to FIGS. 1-4 may be applied to recognition, mining, and synthesis (RMS) workloads. Moreover, virtual vector processing may be applied to applications which have a mix of coarse and fine-grain parallelism that may vary dynamically over time. Also, any application which involves bottom-up (or top-down) traversal of a tree where amount of work is different for different nodes of the tree may utilize virtual vector processing. Some of these instances include linear algebra applications (such as a forward solver, backward solver, Cholesky factorization, and others). Other applications for virtual vector processing may include small short-trip count loops that may be encountered in network and/or graphics applications, such as checksum computations for incoming network packages, subdivision of triangle representation, and/or blending pictures with different amount of transparency graphics.

Referring to FIGS. 1-4, in an embodiment, virtual vector processing may be applied to the following matrix multiplication pseudo code:

```
for (i=0; i < ROWS; i++) {
    for (j=0; j < COLS; j++) {
        Y[i] -= A[i][j] * X[j];
    }
}
```

To perform vector processing, the above pseudo code may be converted to the following virtual vector pseudo code in accordance with at least one instruction set architecture:

```
VV_HEADER ( );
VV_PROLOGUE (0, ROWS, i);
    for (j=0; j < COLS; j++) {
        Y[i] -= A[i][j] * X[j];
    }
VV_EPILOGUE (i);
```

In the above virtual vector pseudo code, VV_HEADER( ) may invoke an initialization routine to initialize virtual vector internal values stored in corresponding locations (e.g., registers 222 and/or storage 252), VV_PROLOGUE communicates the loop bounds (0 and ROWS) and the loop induction variable ("i"), and the VV_EPILOGUE contains the induction variable ("i") without any bounds. The values communicated may be stored in one or more registers (222) or stored as a variable in storage device (such as the cache 116 and/or storage 252). The induction variable may be incremented by each loop iteration. In one embodiment, the core 106 executes the body of the loop between the VV_PROLOGUE and the VV_EPILOGUE, once for each value of the induction variable. As discussed with reference to FIGS. 3 and 4, the number of cores that are used to execute this region of code may be determined at runtime and may vary during the region execution to dynamically adjust to availability of resources.

Furthermore, as discussed with reference to operation 322, the results of performing operations corresponding to a virtual vector request may be provided to the master core in different ways. In one embodiment, multiple privatized variables (e.g., variables stored in cache 116, cache 108, registers 222, and/or storage 252) may be aggregated into a single storage location (which is generally referred to herein as a "reduction" operation). In one embodiment, the following pseudo code may be used to provide reduction:

```
VV_HEADER ( );
    for (i=0; I < ROWS; i++){
        VV_PROLOGUE (0, COLS, j);
            temp -= A[i][j] * X[j];
        VV_EPILOGUE (i, temp, &Y[i]);
    }
```

In the above pseudo code, the product of A[i][j] and X[j] at each loop iteration is aggregated into a global variable Y[i] (which may be stored in cache 116, cache 108, registers 222, and/or storage 252). In the example, this is accomplished by the VV_EPILOGUE call. In addition to the induction variable ("i"), the VV_EPILOGUE call also takes a temporary register-allocated variable ("temp") and the address of the memory location where the aggregation is to be performed ("&Y[i]"). When the loop is executed in parallel, all threads that are involved in the virtual vector computation may compute their private results in this temporary variable ("temp"), and these private results are then aggregated and stored to the specified memory location when the virtual vector computation is complete (such as discussed with reference to operations 322 and 334).

In an embodiment, the loop body may be executed on multiple cores without an explicit thread spawning operation, e.g., to reduce the overhead associated with thread spawning. In such an embodiment, one or more of the following conditions may be imposed on the behavior of the virtual vector code. First, the body of the loop may not consume live-in values through the registers (222). Second, memory locations (such as locations with the memory 114) may not be written to in the loop body, but may be read. Consequently, function calls may not be allowed within the loop body. Control-flow within the loop body may, however, be allowed, but break statements and conditional loop termination within the loop body may not be permitted. Finally, upon completion of the loop, all values may be committed to memory 114 such as discussed with reference to operation 334 of FIG. 3.

Figure 5:
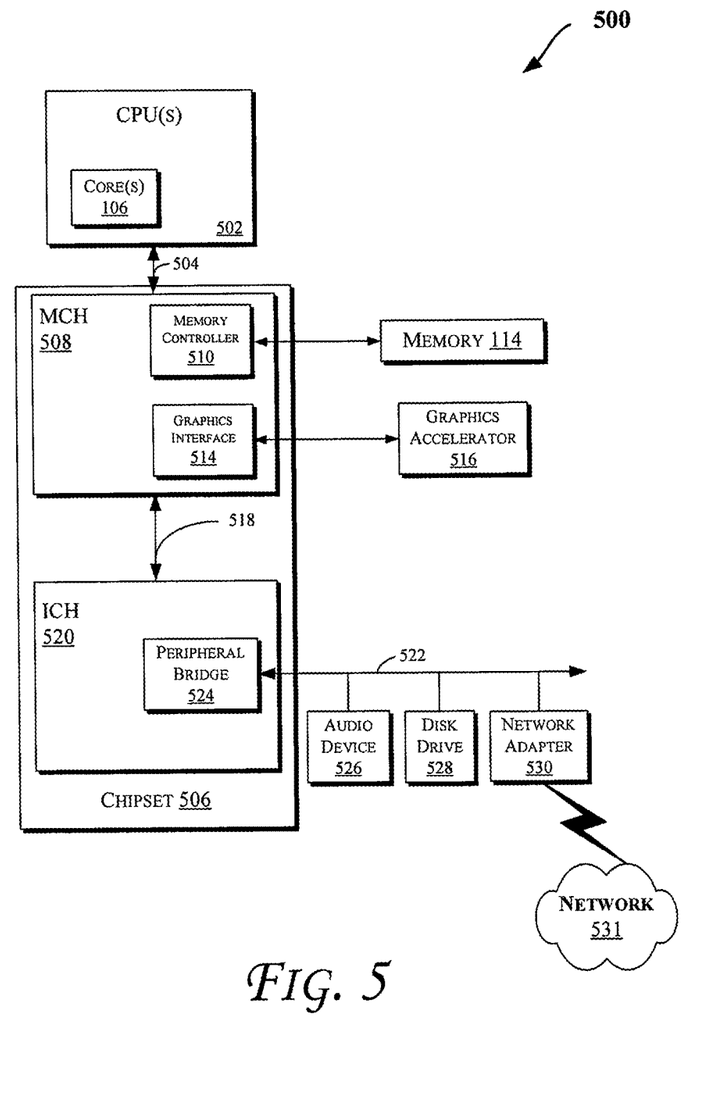

FIG. 5 illustrates a block diagram of an embodiment of a computing system 500. The computing system 500 may include one or more central processing unit(s) (CPUs) or processors 502 that communicate with an interconnection network (or bus) 504. In an embodiment, the processors 502 may be the same as or similar to the processors 102 of FIG. 1. Also, the interconnection network 504 may be the same as or similar to the interconnection networks 104 and/or 112 discussed with reference to FIGS. 1-2. The processors 502 may include any type of a processor such as a general purpose processor, a network processor (e.g., a processor that processes data communicated over a computer network), or another processor, including a reduced instruction set computer (RISC) processor or a complex instruction set computer (CISC) processor. Moreover, the processors 502 may have a single or multiple core design, e.g., including one or more processor cores (106) such as discussed with reference to FIGS. 1-2. The processors 502 with a multiple core design may integrate different types of processor cores on the same integrated circuit (IC) die. Also, the processors 502 with a multiple core design may be implemented as symmetrical or asymmetrical multiprocessors.

As shown in FIG. 5, a chipset 506 may communicate with the interconnection network 504. The chipset 506 may include a memory control hub (MCH) 508. The MCH 508 may include a memory controller 510 that communicates with the memory 114. The memory 114 may store data, e.g., including sequences of instructions that are executed by the processors 502, or any other device in communication with the computing system 500. In one embodiment of the invention, the memory 114 may include one or more volatile storage (or memory) devices such as random access memory (RAM), dynamic RAM (DRAM), synchronous DRAM (SDRAM), static RAM (SRAM), or other volatile memory devices. Nonvolatile memory may also be used such as a hard disk. Additional devices may communicate via the interconnection network 504, such as multiple processors and/or multiple system memories.

The MCH 508 may additionally include a graphics interface 514 in communication with a graphics accelerator 516. In one embodiment, the graphics interface 514 may communicate with the graphics accelerator 516 via an accelerated graphics port (AGP). In an embodiment of the invention, a display (such as a flat panel display) may communicate with the graphics interface 514 through, for example, a signal converter that translates a digital representation of an image stored in a storage device such as video memory or system memory into display signals that are interpreted and displayed by the display. In various embodiments, the display signals produced by the display device may pass through various control devices before being interpreted by and subsequently displayed on the display.

Furthermore, a hub interface 518 may enable communication between the MCH 508 and an input/output (I/O) control hub (ICH) 520. The ICH 520 may provide an interface to I/O devices in communication with the computing system 500. The ICH 520 may communicate with a bus 522 through a peripheral bridge (or controller) 524, such as a peripheral component interconnect (PCI) bridge or a universal serial bus (USB) controller. The bridge 524 may provide a data path between the processor 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), or digital data support interfaces (e.g., digital video interface (DVI)).

The bus 522 may communicate with an audio device 526, one or more disk drive(s) 528, and a network adapter 530. The network adapter 530 may communicate with a computer network 531, e.g., enabling various components of the system 500 to send and/or receive data over the network 531. Other devices may communicate through the bus 522. Also, various components (such as the network adapter 530) may communicate with the MCH 508 in some embodiments of the invention. In addition, the processor 502 and the MCH 508 may be combined to form a single chip. Furthermore, the graphics accelerator 516 may be included within the MCH 508 in other embodiments of the invention.

In an embodiment, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media for storing electronic data (e.g., including instructions).

Figure 6:
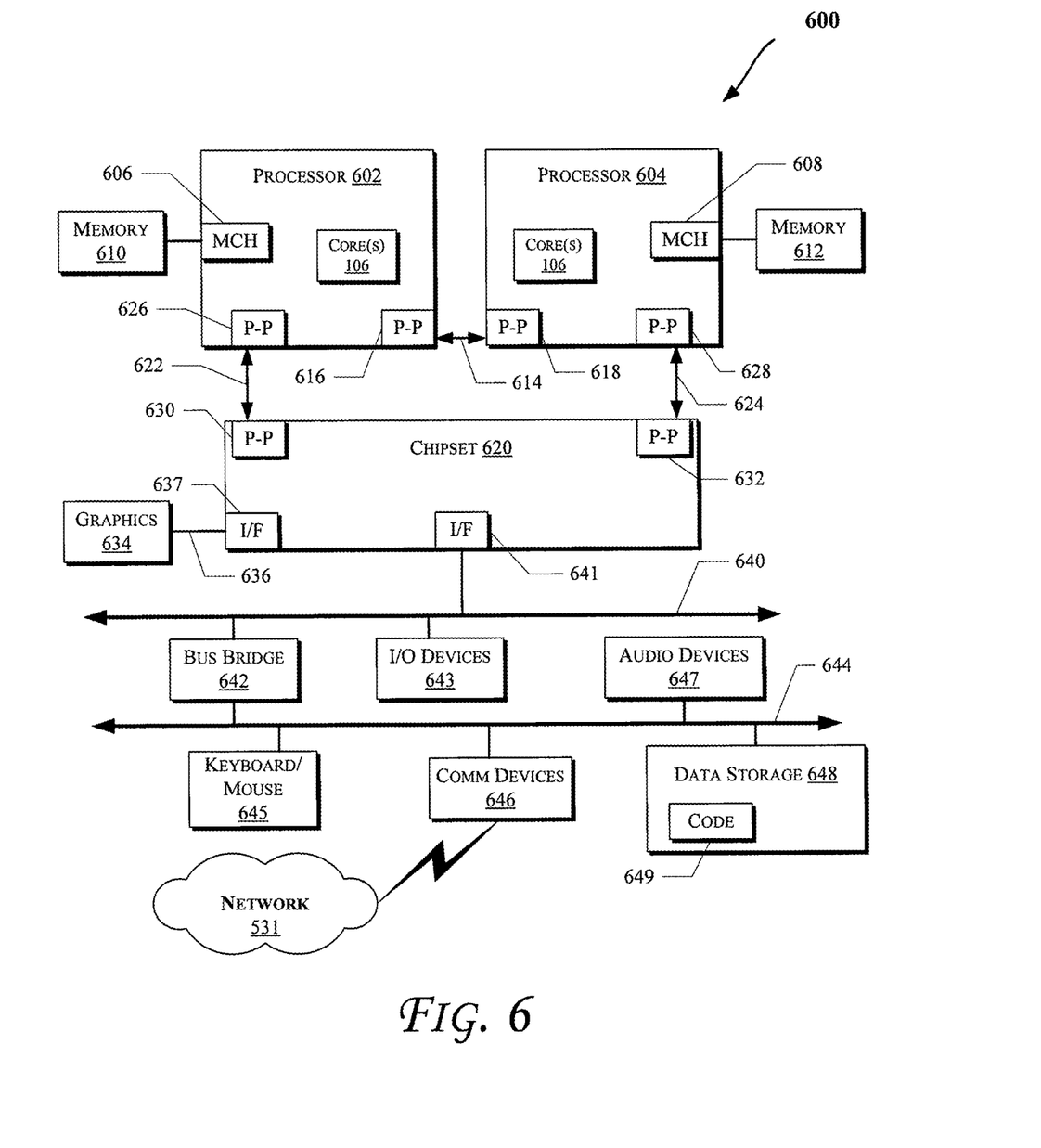

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 114 of FIGS. 1-3 and 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

At least one embodiment of the invention may be provided within the processors 602 and 604. For example, one or more of the cores 106 of FIG. 1 or 2 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6. The chipset 620 may communicate with a bus 640 using a PtP interface circuit 641. The bus 640 may have one or more devices that communicate with it, such as a bus bridge 642 and I/O devices 643. Via a bus 644, the bus bridge 643 may communicate with other devices such as a keyboard/mouse 645, communication devices 646 (such as modems, network interface devices (e.g., the network adapter 530 of FIG. 5), or other communication devices that may communicate with the computer network 531), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
    a first logic circuitry to allocate a first portion of one or more operations corresponding to a virtual vector request to a first processor core; and
    a second logic circuitry to generate a first signal corresponding to a second portion of the one or more operations.

2. The apparatus of claim 1, further comprising a second processor core to receive the first signal, wherein the second processor core comprises:
    a third logic circuitry to allocate a third portion of the one or more operations to the second processor core; and
    a fourth logic circuitry to generate a second signal corresponding to a fourth portion of the one or more operations.

3. The apparatus of claim 2, wherein the third logic circuitry is to allocate the third portion based on information corresponding to one or more available resources of the second processor core.

4. The apparatus of claim 2, wherein the third logic circuitry is to allocate the third portion based on information corresponding to the first signal.

5. The apparatus of claim 2, further comprising a fourth logic circuitry to maintain information corresponding to one or more available resources of the second processor core.

6. The apparatus of claim 2, wherein the third logic circuitry is to allocate the third portion based on overhead information corresponding to communication with one or more of the first processor core or a third processor core.

7. The apparatus of claim 2, further comprising a fifth logic circuitry to transmit an acknowledgment signal to the first processor core after the second processor core has retired one or more operations corresponding to the third portion.

8. The apparatus of claim 1, wherein the first processor core comprises one or more of the first logic circuitry or the second logic circuitry.

9. The apparatus of claim 1, further comprising a plurality of processor cores.

10. The apparatus of claim 1, further comprising a third logic circuitry to maintain information corresponding to one or more available resources of the first processor core.

11. The apparatus of claim 1, wherein the first logic circuitry is to allocate the first portion based on information corresponding to one or more available resources of the first processor core.

12. The apparatus of claim 1, further comprising a second processor core to generate a second signal, wherein the first logic circuitry is to allocate the first portion based on information corresponding to the second signal.

13. The apparatus of claim 1, further comprising a third logic circuitry is to schedule one or more tasks corresponding to the first portion.

14. The apparatus of claim 1, wherein the first logic circuitry is to allocate the first portion based on overhead information corresponding to communication with a second processor core.

15. The apparatus of claim 1, further comprising a memory to store one or more instructions corresponding to the virtual vector request.

16. The apparatus of claim 1, further comprising a third logic circuitry to aggregate a first computational result corresponding to the first portion and a second computational result corresponding to the second portion.

17. The apparatus of claim 1, wherein the first signal comprises data corresponding to one or more of an identifier of the first processor core, a starting value corresponding to the second portion, or an end value corresponding to the second portion.

18. A method comprising:
    executing a first set of operations corresponding to a virtual vector instruction on a first processor;
    generating a first signal corresponding to a second set of operations of the virtual vector instruction; and
    executing at least a portion of the second set of operations on a second processor.

19. The method of claim 18, further comprising allocating the first set of operations based on information corresponding to one or more available resources of the first processor.

20. The method of claim 18, further comprising maintaining information corresponding to one or more available resources of one or more of the first processor or the second processor.

21. The method of claim 18, further comprising allocating the first set of operations based on overhead information corresponding to communication between the first processor and the second processor.

22. The method of claim 18, further comprising transmitting an acknowledgment signal to the first processor after the second processor has retired one or more operations corresponding to the second set of operations.

* * * * *